United States Patent [19]
Crystal

[11] 3,936,519
[45] Feb. 3, 1976

[54] METHOD OF EXTRUDING FOAMED PLASTIC SHEATHED PENCILS

[76] Inventor: Milton Crystal, 1541 Lemoine Ave., Fort Lee, N.J. 07024

[22] Filed: Apr. 24, 1974

[21] Appl. No.: 463,813

[52] U.S. Cl. .............. 264/46.1; 264/45.9; 264/174; 401/96; 425/113; 425/817 C; 428/310; 428/315; 428/408
[51] Int. Cl.². B29D 27/00; B29F 3/10; B43K 19/14
[58] Field of Search .............. 264/45, 47, 174, 45.9, 264/46.1; 401/96; 425/114, 113, 817 C; 428/310, 315, 408

[56] References Cited
UNITED STATES PATENTS

| | | | |
|---|---|---|---|
| 2,319,585 | 5/1943 | Chesler | 401/96 |
| 2,960,967 | 11/1960 | Bauserman | 401/96 |
| 3,175,538 | 3/1965 | Gossel | 401/96 |
| 3,625,788 | 12/1971 | Bartner | 264/47 X |
| 3,704,071 | 11/1972 | Muller et al. | 401/96 |
| 3,764,642 | 10/1973 | Boutillier | 264/DIG. 14 |
| 3,804,574 | 4/1974 | Gatto | 264/DIG. 14 |
| 3,875,088 | 4/1975 | Arons et al. | 401/96 X |

FOREIGN PATENTS OR APPLICATIONS

| | | | |
|---|---|---|---|
| 2,055,894 | 5/1971 | France | 401/96 |
| 677,232 | 8/1952 | United Kingdom | 264/174 |
| 579,860 | 7/1958 | Italy | 401/96 |
| 1,574,122 | 7/1969 | France | 401/96 |

*Primary Examiner*—Philip Anderson

[57] ABSTRACT

An automated system for fabricating a lead pencil in which the lead is securely bonded to a sheath formed of foam plastic material and having a smooth skin. In the system, individual pieces of lead which are pretreated with a heat-activatable adhesive layer, are sequentially fed into an extrusion die in which the lead is ensheathed by molten foam plastic material whose heat serves to activate the adhesive. The string of ensheathed lead pieces emerging from the die are advanced through a sizing jig in a cooling station wherein the diameter of the sheath is rendered uniform and the surface thereof is formed into a smooth skin, the sheath being rigidified in the station and the activated adhesive being set to strongly bond the lead to the sheath. The resultant rod is fed to a cut-off station which serves to sever the rod into individual pencils.

3 Claims, 2 Drawing Figures

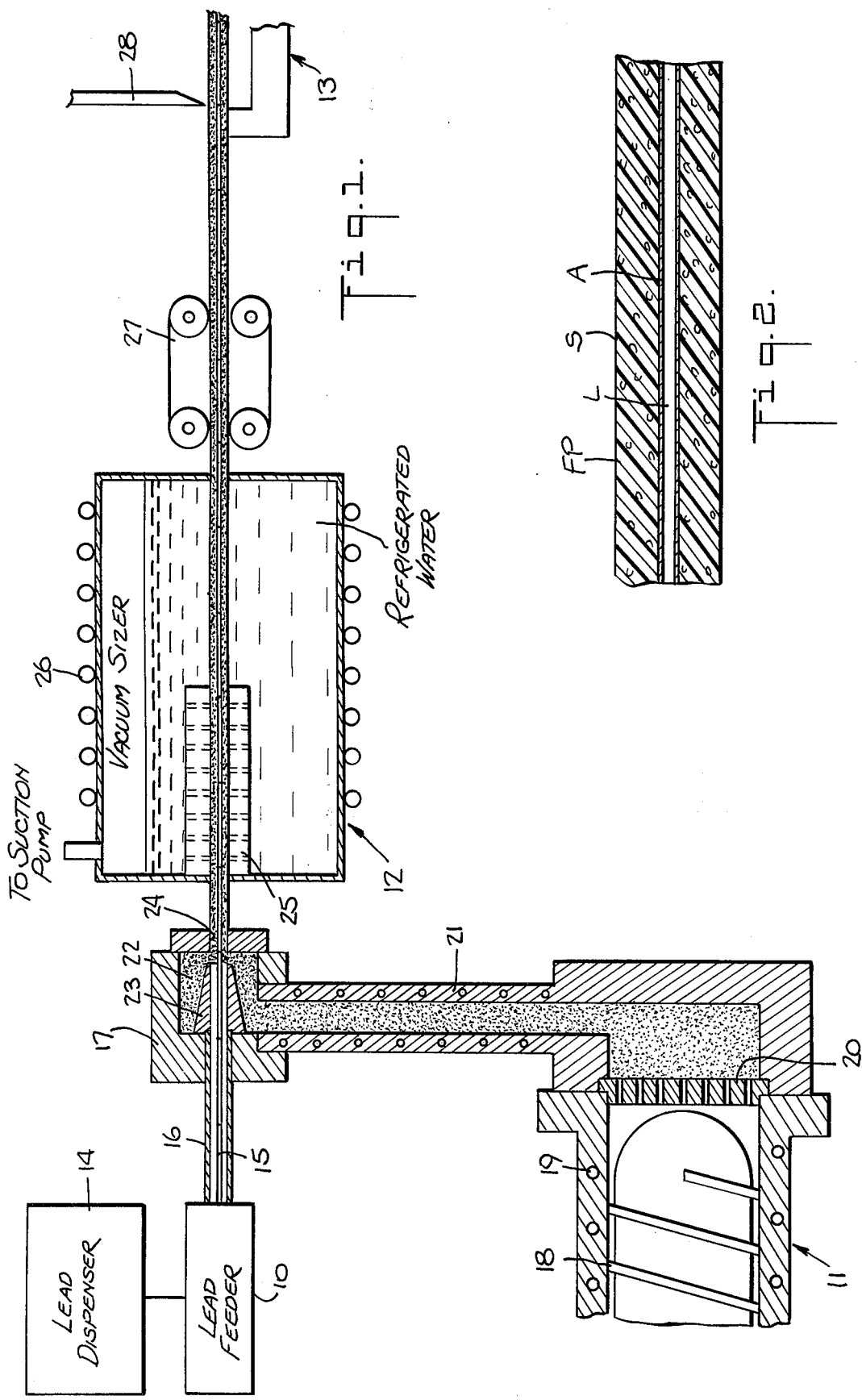

3,936,519

METHOD OF EXTRUDING FOAMED PLASTIC SHEATHED PENCILS

BACKGROUND OF THE INVENTION

This invention relates generally to the manufacture of lead pencils, and more particularly to a technique for fabricating pencils having a sheath formed of foam plastic material.

The conventional pencil consists of a core or lead locked within a sheath or casing made of wood. The lead is a mixture of clay and graphite, the clay serving as a binder. The hardness of the lead is determined by the ratio of clay to graphite in the mixture. The wood must be of a special quality in that in the finished pencil, the sheath not only acts as the support for the relatively fragile lead, but it must also lend itself readily to sharpening.

The technique for manufacturing pencils with wooden sheaths and lead cores is costly and time-consuming, for not only are at least 12 steps involved in the manufacturing procedure, but a large quantity of wood is wasted. With the increasing shortage of wood acceptable for pencils, the waste factor becomes less tolerable.

In the standard method of making lead pencils, a wood block, usually of cedar, is first cut into small slabs which are then provided with an array of parallel grooves to accommodate the leads. A second grooved slab is placed over the first slab to enclose the leads, the two slabs being then glued together. Thereafter the joined slab assembly is fed through a cutting machine to produce individual pieces which are thereafter shaped into the familiar hexagonal or round forms. Finally the pencils are painted and erasers are installed at the ends.

Among the problems encountered with conventional pencils having wood sheaths are the following:

A. Pencils are exposed to varying degrees of temperature and humidity, causing the wood to expand or dry out as a result of which the lead loosens in the sheath and slips out and breaks. This is especially characteristic of pencils formed of two wood slabs having different grains.

B. When the wood sheath is manually sharpened, the grain of the wood tends to guide the knife, and in some cases the persons sharpening the pencil cannot control the direction of cutting in the desired manner. And with machine-sharpened wood pencils, the sharpened point is left rough because the cutting blades operate across the grain.

C. Cedar for wood pencils is now difficult to obtain and what cedar is available is quite expensive.

In order to reduce the cost of manufacturing lead pencils, attempts have been made to substitute a moldable material for the wooden sheaths. Thus in U.S. Pat. No. 1,649,892, a pulp mass is extruded simultaneously with the advance of a central lead to form a pencil. This process requires subsequent evaporation of the moisture content of the extruded pulp to render the body rigid and inflexible. In a similar fashion, U.S. Pat. No. 1,937,104 forms a sheath of wood flour and a water-soluble binder.

It is also known, as evidenced by the U.S. Pat. Nos. 2,960,967 and 3,551,064, to form the sheath of extruded plastic material. And while the substitution of synthetic plastic for wood overcomes the problem of wood shortages, pencils of the type theretofore known have a serious disadvantage for there is not an adequate bond between the lead and the plastic sheath; hence the lead has a tendency to slip out and break.

SUMMARY OF THE INVENTION

In view of the foregoing, it is the main object of this invention to provide an improved method of fabricating a pencil having a plastic sheath.

More particularly, it is an object of this invention to provide an automated system for producing lead pencils having a sheath formed by a foam plastic material whose outer skin is relatively smooth. A significant advantage of a pencil of this type is that the sheath has a porous, non-grained structure and may be sharpened without difficulty, either manually or by machine, without leaving a rough surface on the tip.

A salient feature of the invention is that the central lead is securely bonded to the foam-plastic sheath, whereby slippage of the lead relative to the sheath and breakage of the lead are avoided.

Yet another object of the invention is to provide a system for efficiently mass-producing plastic-sheathed pencils at high-speed and low-cost.

Briefly stated, these objects are attained in a system in which individual pieces of lead pre-treated with heat-activatable adhesive are sequentially fed into an extrusion die wherein the lead is surrounded by molten foam plastic material whose heat serves to activate the adhesive. The ensheathed lead pieces emerging from the die are advanced through a sizing jig in a cooling station wherein the diameter of the sheath is rendered uniform and the surface thereof is pressed into a smooth skin, the sheath being rigidified in the station and the activated adhesive being set to strongly bond the lead to the sheath thereby producing a continuous rod which is fed to a cut-off station wherein the rod is periodically severed to form individual pencils.

OUTLINE OF THE DRAWING

For a better understanding of the invention as well as other objects and features thereof, reference is made to the following detailed description of the invention to be read in conjunction with the accompanying drawing wherein:

FIG. 1 is a schematic diagram of a system for producing synthetic plastic pencils in accordance with the invention; and, FIG. 2 is a section taken through the pencil.

DESCRIPTION OF THE INVENTION

Referring now to FIG. 1, there is shown a system for fabricating pencils having a plastic sheath in accordance with the invention, the system being constituted by an automatic lead feeder unit 10, an extruder 11, a cooling station 12 and a cut-off station 13.

The lead feeder unit 10 is adapted to receive from a dispenser 14, individual lengths of graphite-clay leads 15 and to feed these leads sequentially into the central tube 16 of a coaxial extrusion die 17. The feeder may be in the form of a hydraulically operated reciprocating piston or any other suitable means for receiving a lead and for ejecting it axially. The leads are all pre-treated with a heat-activatable adhesive, so that each lead is thinly and uniformly coated with a solid thermoplastic material which quickly melts upon heating and then sets to a firm bond upon cooling. A hot melt or heat activatable adhesive, as distinguished from most other types set by evaporation of a solvent, tends to bond almost instantaneously, rendering the adhesive well-suited to automated operations.

The nature of the heat-activatable adhesive is determined by the chemistry of the plastic sheath to which lead bonding is effected. Typical ingredients for heat-activatable adhesives are polyethylene, polyvinyl acetate, polyamides, hydrocarbon resins as well as bitumens and resinous materials. Thus where the sheath is formed of a polyvinyl chloride foam plastic material, a vinyl based adhesive is appropriate.

The foam plastic sheath may be formed of polystyrene, ABS resin, polypropylene or any other known foam material having acceptable pencil sheath properties. A preferred foam is polyvinyl chloride (PVC) foam which has good aging characteristics and physical properties in comparison to other materials and is resistant to hydrolysis, oxidation, mildew, chemicals and solvents, as well as being non-flammable. Most foam is expanded through the use of chemical blowing agents which are activated at or about fusion temperature or at a suitable melt temperature, thereby producing a gas which expands to create the cellular structure.

Cellular vinyl may be expanded through the use of a gas or low boiling liquid which is dissolved in a plastisol under pressure. The pressure is released after fusion, resulting in expansion. This technique may be used in the present invention in the extrusion device wherein the vinyl is blown as it emerges from the orifice of die 17 into atmospheric pressure.

In the extruder station, the plastic stock in particular form is fed into a cylindrical chamber containing a rotating feed screw 18 which advances the powder past a heater 19 surrounding the chamber. The molten plastic is then forced through a breaker plate 20 into a heated lateral passage 21 which conducts the molten plastic into the annular chamber 22 in die 17.

Supported in chamber 22 is a conical core 23 which terminates the central tube 16, whereby the advancing lead 15 which passes through the die orifice 24 is encased with a cylindrical sheath of plastic material, the plastic foaming as it emerges from the die orifice.

The heat of the molten plastic activates the adhesive layer on the lead. The foam-coated string of lead pieces is then conducted through a sizing jig 25 in the evacuated chamber of the cooling station 12. The chamber is partially filled with water to a level above the jig, the jig being foraminous whereby the plastic passing therethrough is subjected to the reduced atmospheric pressure. The sizing jig serves to constrict the advancing foam-coated lead so as to render the diameter thereof uniform.

The cross-sectional shape of the jig bore determines the ultimate shape of the pencil. The shear forces produced by the jig forms a smooth and somewhat glossy, closed cell skin on the surface of the resultant rod which rigidifies as the rod passes continuously through the water bath in the chamber and is quenched thereby. Suitable cooling coils 26 surround the chamber to refrigerate the water therein. The low atmospheric pressure in the chamber acts to further expand the cells in the molten plastic and to cause the sheath to press outwardly against the wall of the jig bore, thereby enhancing the effect of the jig on the formation of a smooth skin.

The cooling action also acts to set the hot-melt adhesive, thereby bonding the lead to the sheath. The continuous rod is advanced by suitable take-off belts 27, the rod being fed into cut-off station 13 in which a reciprocating blade 28 acts to cut the rod into individual pencil pieces.

Each piece, as shown in FIG. 1 consists of a central lead L which is bonded by an adhesive layer A to a rigid open-cell foam plastic sheath FP whose outer surface S is a smooth closed cell, somewhat glossy skin. In practice, the plastic may be pigmented to impart a desired color thereto. Because the sheath is cellular and has no grain, it may be readily sharpened, and because the lead is securely adhered to the sheath no slippage thereof is experienced.

While there has been shown a preferred embodiment of an Extruded Foam Plastic Lead Pencil, it will be appreciated that many changes may be made therein without departing from the essential spirit of the invention. For example, multiple extruders may be used to form foam-plastic sheaths provided with differently colored stripes or other decorative features.

I claim:

1. The method of fabricating pencils comprising the steps of:
    A. advancing through the central tube of a coaxial die a graphite-clay lead pre-treated with a layer of heatactivatable adhesive, said die having an annular chamber surrounding said tube,
    B. forcing into said annular chamber a molten plastic material containing a blowing agent, whereby the lead emerging from the die is coated with a cylindrical sheath of the molten foamed plastic material, the heat of which activates said adhesive,
    C. passing the ensheathed lead through a cooling station to set said adhesive to effect a bond between the lead and the sheath and to rigidify said molten foamed plastic material to form a pencil rod.

2. The method as set forth in claim 1, wherein said leads are fed sequentially into said die to continuously produce a rod formed by a string of said leads surrounded by a sheath, and further including the steps of cutting said rod into individual pencils.

3. The method as set forth in claim 1, wherein said cooling is accompanied by constriction of said foam plastic in a sizing jig to produce shear forces that close the cells on the surface thereof to impart a closed cell skin to the surface thereof, said constriction acting to make the diameter of said sheath uniform.

* * * * *

UNITED STATES PATENT OFFICE
CERTIFICATE OF CORRECTION

PATENT NO. : 3,936,519
DATED : February 3, 1976
INVENTOR(S) : Milton Crystal

It is certified that error appears in the above-identified patent and that said Letters Patent are hereby corrected as shown below:

Column 3, line 30 "particular" should have read
-- particulate --

Column 4, line 35 "heatactivatable" should have read
-- heat-activatable --

*Signed and Sealed this*

*twentieth* Day of *April 1976*

[SEAL]

Attest:

RUTH C. MASON
*Attesting Officer*

C. MARSHALL DANN
*Commissioner of Patents and Trademarks*